Oct. 5, 1943.    A. E. MATHEY    2,330,983
LIQUID LEVEL INDICATING MEANS
Filed Oct. 22, 1941
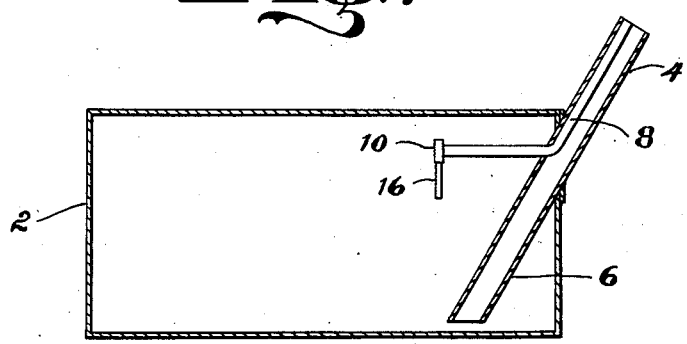
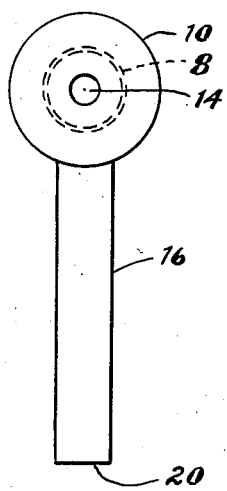
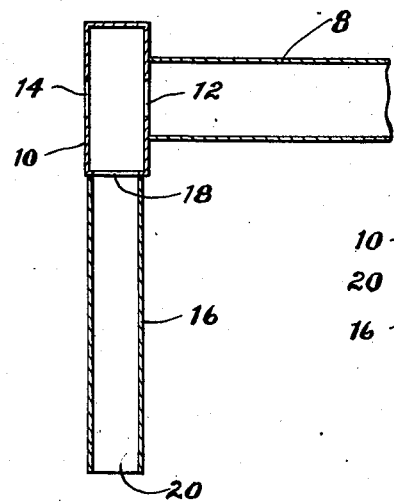
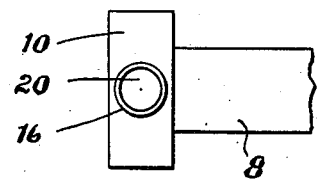
Inventor
Alcide E. Mathey
Yardley Chittick
Attorney Patented Oct. 5, 1943

2,330,983

UNITED STATES PATENT OFFICE 2,330,983

LIQUID LEVEL INDICATING MEANS

Alcide E. Mathey, Boston, Mass., assignor to Scully Signal Co., East Cambridge, Mass., a corporation of Massachusetts Application October 22, 1941, Serial No. 416,009

6 Claims. (Cl. 116—109)

This invention relates to signaling means for indicating when the level of liquid in a closed tank has risen to a given point.

The invention is concerned particularly with the provision of an audible signal which will come into operation when the liquid has reached the desired level so that the operator will be advised when to shut off the entering liquid.

The invention further contemplates the provision of an audible signal which will be simple in construction, cheap to manufacture, and will have no moving parts.

A further object of the invention is the provision of an audible signal that may be connected in series with a vent pipe, but so constructed that when the signal is cut off by liquid coming in contact with the device, any spitting tendency will be materially minimized.

These and other objects of the invention will become more apparent as the explanation proceeds with the aid of the accompanying drawing, in which Fig. 1 is a sectional elevation of a liquid-containing tank, showing the general relation of the fill pipe, the vent pipe and the signaling device.

Fig. 2 is a sectional elevation of the signaling device.

Fig. 3 is a front elevation of the signaling device.

Fig. 4 is a view of the signaling device from the bottom.

Referring to Fig. 1, a closed tank 2 is shown, which may be of any size desired. A fill pipe 4 leads into the tank, and in this instance has an extension 6 which goes nearly to the bottom and constitutes what is known as a deep fill. The location and construction of the fill pipe is unimportant so long as it is arranged so that when the liquid approaches the level at which the indication is to be given, the vented gas will be compelled to escape, in part at least, through the vent pipe rather than through the fill pipe. By the provision of the deep fill 6, it is obvious that, after the liquid has risen above the bottom end thereof, the vented vapors cannot escape through the fill pipe 4, but on the other hand, must escape through such other vent or vents as may be provided. Another means of preventing escape of gas through the fill pipe is by the incorporation of an elbow therein, which expedient is also well known in the art.

In the construction shown, a vent pipe 8 leads into the tank from an aperture through the wall of fill pipe 4, but it may be arranged otherwise if more convenient. That is, the vent pipe 8 could lead directly to the atmosphere through the top or side of the tank. There is no need for any connection between fill pipe 4 and vent pipe 8, the arrangement shown being one of convenience only.

On the inner end of the vent pipe 8 is attached a button type whistle 10, which has aligned ports 12 and 14. A front view of the whistle is shown in Fig. 3.

Extending downwardly from the whistle 10 is a tube 16 connecting directly with the interior of the whistle through an opening 18 and terminating in an entering port 20. The level at which port 20 at the lower end of tube 16 is located determines the point at which the signal will be given. Accordingly, after the level to which the tank is to be filled has been decided upon, tube 16 may be made of such length that the lower end is at this elevation. Of course, the position of the whistle may be raised or lowered to assist in adjusting the position of the lower end of tube 16.

The button whistle 10 is a form well known and has been in use for many years in devices of this kind. It is particularly suitable for this purpose, as it makes a clearly audible signal under very small operating pressures. This type whistle is also capable of being rendered audible or inaudible by varying the nature of the resonance chamber. The opening 18 through the whistle wall and tube 16 together provide means for varying the character of the resonance chamber so that the desired signal will be produced when the liquid level has risen to seal the lower end of tube 16 at port 20.

The above-described construction operates in the following manner: As liquid enters the tank 2 through fill pipe 4, the gas is vented through vent pipe 8 to the atmosphere. The gas enters the vent pipe through two channels, namely, through the port 14 to the interior of whistle 10 and through port 20, tube 16 and opening 18 to the interior of whistle 10. At this point the escaping gases merge and then continue through port 12 to vent pipe 8.

Because of the nature of the whistle, the gas flowing through tube 16 destroys the resonance so that, during filling, no signal is heard so long as the liquid level is below port 20.

When, however, the rising liquid closes port 20, it is then necessary for any gas vented thereafter to pass exclusively through aperture 14. Since flow of gas through tube 16 has been stopped, the resonant characteristics of the whistle return and the flow of gas through ports 14 and 12 to vent pipe 8 produces a clearly audible sound which will indicate to the operator that the liquid level has risen to at least the lower end of tube 16, thereby giving the indication that the filling should be terminated.

The length of tube 16, coupled with the pressure that develops within the tube as soon as port 20 is sealed by the rising liquid level, precludes the possibility of any of the liquid rising into whistle 10 until adequate time has elapsed to permit the operator to cut off the supply.

The invention therefore contemplates a resoonance chamber, which in the disclosed construction consists of whistle 10 and the interior of connected pipe 16. The gas, during filling, flows into this resonance chamber through two ports, and as long as this continues, there will be no sound, but when the lower entrance is closed, sound commences. Following the sealing of port 20, it is not necessary that the resonance chamber be reduced to the size of whistle 10 before sound is produced, as the resonance chamber is effective when it consists partly of whistle 10 and partly of tube 16. In any event, after the lowermost entrance to the resonance chamber has been sealed, the whistle commences, thereby giving the indication.

While there has been shown and described a preferred form of the invention, it should be distinctly understood that I do not intend to be limited thereby, but only by the appended claims.

I claim:

1. Liquid elevel indicating means for use with a tank, comprising a tank, a fill pipe therefor, a vent to the atmosphere, a whistle in series with said vent, said whistle comprising a resonance chamber, a first port leading from said chamber to the interior of the tank, a downward extension from said chamber, a second port opening from said extension at a point substantially below said first port, the ports to said resonance chamber so constructed that, during filling of said tank, gas will flow thereinto from both ports and no signal will be heard, but when the lower port is sealed through the rise of the liquid level so that gas flows to said vent through said first port only, said resonance chamber will produce an audibile signal, thereby indicating the level of liquid in said tank.

2. Liquid level indicating means for use with a tank, comprising in combination a closed tank, a fill pipe connected thereto, a vent pipe leading from the interior of said tank to the exterior thereof, means for insuring a flow of gas through said vent pipe during filling, an audible signaling device attached to the interior end of said vent pipe and having a port therethrough in series with said vent pipe, said device having a resonance chamber, an opening through the side of said chamber, a tube extending downwardly from said opening and forming an extension of said resonance chamber, the construction of said signaling device being such that when gas flows into said resonance chamber through said port and said tube, no signal will be heard, but when gas flows into said resonance chamber through said port only, an audible signal will be given.

3. A liquid level indicating device for use with a tank, comprising a vent pipe, a whistle attached to one end of said vent pipe having a port therethrough whereby gas may flow through said whistle into said vent pipe, an opening leading from the interior of said whistle, a tube connected to said opening and extending downwardly to a point below said whistle port, the structure formed by said whistle and connected tube constituting a resonance chamber whereby when gas flows to said vent pipe through said whistle port and tube, said whistle will be substantially inaudible, but when said tube is closed against the flow of gas therethrough so that gas flowing to said vent pipe flows through said whistle port only, an audible sound will be produced.

4. A liquid level indicating device for use with a tank, comprising a vent pipe, a button type whistle attached to one end of said vent pipe, with the ports of said whistle in series with said vent pipe, an opening through the wall of said whistle, a tube attached to said whistle at said opening and extending downwardly therefrom to a point substantially below the entrance opening to said whistle, said whistle and said tube constituting together a resonance chamber which is capable of producing an audible signal when said tube is closed and gas is flowing through said whistle to said vent pipe, but which will be substantially inaudible when gas is flowing to said vent pipe through said whistle ports and said tube.

5. A liquid level indicating device which may be positioned in an opening in a closed tank to provide a venting passage from the interior of the tank to the exterior thereof, said device comprising a whistle including, a resonance chamber, a single port from said whistle, which, when said structure is in position with respect to a tank with which it may be used, leads to the atmosphere, two other ports leading to the resonance chamber of said whistle, one of said two other ports formed by a downwardly extending tube, the entrance to said tube being located a substantial distance below the other of said two other ports, the construction and proportions of said resonance chamber and connected tube being such that when gas flows to said resonance chamber through both said two other ports and from said resonance chamber to the port leading to the atmosphere, the device will be substantially inaudible, but when said tube is closed so that gas flows to said resonance chamber from the upper of said two other ports only and thence through the port leading to the atmosphere, said device will produce an audible sound.

6. Liquid level indicating means for use with a tank comprising in combination a closed tank having filling means, a whistle, said whistle comprising a chamber having two entrances and an exit, said extrances exposed to the gas in the tank and said exit leading to the atmosphere, means for causing the passage of substantially all vented gas through said entrances, chamber and exit, one entrance to said chamber located at a point substantially below the other entrance, the lower entrance determining the level at which the indication will be given, the whistle construction being such that during filling of said tank gas will flow from said tank to said chamber through both entrances to merge in said chamber and then will flow through said exit in a substantially inaudible manner, but when said lower entrance is sealed through the rise of liquid level within the tank so that gas flowing to said chamber and exit passes solely through said other etrance, said chamber will produce an audible signal thereby indicating that the liquid has risen to the desired level.

ALCIDE E. MATHEY.